United States Patent [19]
Irwin et al.

[11] Patent Number: 5,139,135
[45] Date of Patent: Aug. 18, 1992

[54] REDUCED RADIUS SPIRAL CONVEYOR WITH PLASTIC BELTS

[76] Inventors: Guy Irwin, 512 Oreland Mill Rd., Oreland, Pa. 19075; Andre Robin, 8630 Farley Way, Fair Oaks, Calif. 95628

[21] Appl. No.: 656,853

[22] Filed: Feb. 19, 1991

[51] Int. Cl.$^5$ ............................................. B65G 17/06
[52] U.S. Cl. ..................................... 198/852; 198/778; 198/831
[58] Field of Search ............... 198/778, 831, 852, 851, 198/848, 849, 850

[56] References Cited

U.S. PATENT DOCUMENTS

| | | | |
|---|---|---|---|
| 2,703,644 | 3/1955 | Van Lake | 198/848 |
| 3,467,239 | 9/1969 | Roinestad | 198/852 |
| 4,078,655 | 3/1978 | Roinestad | 198/848 |
| 4,867,301 | 9/1989 | Roinestad et al. | 198/852 |
| 4,941,566 | 7/1990 | Irwin | 198/778 |
| 4,944,162 | 7/1990 | Lang et al. | 198/831 X |

*Primary Examiner*—Joseph E. Valenza
*Assistant Examiner*—Cheryl L. Gastineau
*Attorney, Agent, or Firm*—Morrison Law Firm

[57] ABSTRACT

An improved conveyor belt and an improved capstan coact to yield a spiral conveyor having a reduced lateral turning radius. Power transmission from the capstan to the conveyor is increased by projections on the inner edge of the belt that cooperate with grooves on the peripheral surface of the capstan. The projections have a cross section in the form of half a teardrop to facilitate disengagement from the rotating capstan. The grooves are longitudinally formed in bars disposed in parallel about the periphery of the capstan. The bars are inclined such that the grooves are generally parallel to the relative motion of the belt inner edge and the capstan peripheral surface. The conveyor belt is further provided with a central tension fibre comprising a plurality of longitudinally disposed interconnecting links, each in the form of an asymmetrical clevis, specially adapted to transmit power from the capstan driven inner edge of the conveyor belt to the dragging outer edge. To reduce weight, the belt is predominantly formed of plastic.

2 Claims, 10 Drawing Sheets

REDUCED RADIUS SPIRAL CONVEYOR WITH PLASTIC BELTS

BACKGROUND OF THE INVENTION

The present invention relates to material handling equipment, and more particularly to a conveyor system having a turn or curve in the load carrying path.

The use of spiral conveyor systems for extending the effective length of a conveyor belt within a given area of floor space is well established. Such spiral conveyor systems are, for example, frequently used in the food industry to hold freshly baked or cooked goods in a cooling environment for some time prior to a succeeding operation, such as packaging.

A continuing problem of such conveyor systems is the space that they require. Considerable effort is being expended in the development of small or reduced radius conveyor belts that can turn within a smaller lateral radius than conventional conveyor belts, while being of the same width as the belts used on conventional spiral conveyor systems. Such a small radius spiral conveyor is disclosed in U.S. Pat. No. 4,078,655.

A major problem associated with small radius conveyor systems is that, as the turning diameter of the conveyor belt is reduced, the tension on the belt is increased. This increased tension causes premature failure of belt components and severely reduces belt life. A second problem associated with small radius spiral conveyors is that as the turning radius is decreased, the transmission of power from the capstan to the conveyor belt must be increased. Such an increased level of power transmission is not possible with conventional conveying equipment.

OBJECTS AN SUMMARY OF THE INVENTION

Accordingly, it is an object of the invention to provide a conveyor system which overcomes the drawbacks of the prior art.

It is a further object of the invention to provide an improved conveyor system that requires a smaller floor space than a conventional system, while using a conveyor belt of the same width as the conventional system.

It is a still further object of the invention to provide a reduced radius conveyor system with an improved drive capstan and an improved conveyor belt cooperating therewith for increased power transmission from the capstan to the belt.

It is a still further object of the invention to provide a turn conveyor belt having improved means for transmitting power from the inner edge of the belt to the outer edge as the belt follows a curved path.

Briefly stated, there is provided an improved conveyor belt and an improved capstan that coact to yield a spiral conveyor system having a reduced lateral turning radius. Projections on the inner edge of the belt cooperate with grooves on the peripheral surface of the capstan to increase power transmission from the capstan to the conveyor. The projections have a cross section in the shape of half a teardrop to facilitate disengagement from the rotating capstan. The grooves are formed longitudinally in bars disposed in parallel about the periphery of the capstan. The bars are inclined such that the grooves are generally parallel to the relative motion of the belt inner edge and the capstan peripheral surface. The conveyor belt is further includes central tension fibre having a plurality of longitudinally disposed interconnecting links, each in the form of an asymmetrical clevis, specially adapted to transmit power from the capstan-driven inner edge of the conveyor belt to the dragging outer edge. To reduce weight, the belt is predominantly formed of plastic.

According to an embodiment of the invention, there is provided a conveyor belt of the type having a normal orientation to follow one path and alternate orientations with a collapsed inner edge and an expanded outer edge to follow alternate paths curved laterally to one side of the path, the belt including; a plurality of longitudinally spaced rods extending laterally across the belt and having inner and outer ends along the inner and outer edges of the belt and central portions therebetween, central link means including central links arranged in at least one longitudinal row pivotally interconnecting the central portions of the rods, the central link means having a tractive condition with the rods in the normal orientation and in at least some of the alternate orientations, edge link means arranged in at least one longitudinal row along each edge of the belt including inner links and outer links pivotally interconnecting the inner and outer ends of the rods, the edge link means being longitudinally collapsible and expandable along their the rows, the inner links having a normal fully expanded and tractive condition in the normal orientation and a collapsed condition in alternate orientations, and the outer links having a normal condition in the normal orientation and being expanded from the normal condition in the alternate orientations, the improvement comprising; the central links being substantially in the form of an asymmetrical, truncated clevis including a center portion and two opposing legs of unequal length, the center links being disposed with the shorter of the two legs on the inner side of the belt so as to accept drive loads and the resultant tension from the inner links, and the longer of the two legs on the outer side of the belt so as to accept the drag from the outer links, when the belt is in the normal orientation, the legs being spaced apart sufficiently to loosely allow insertion of the center portion of another of the center links therebetween.

According to a further feature of the invention, there is provided a spiral conveyor of the type comprising a conveyor belt of a type that is capable of telescoping at least one edge to conform to a spiral shape, a generally cylindrical capstan having a vertical axis, means for rotating the capstan about the vertical axis, at least a portion of the conveyor belt being conformed in the spiral shape with an inner edge thereof contacting the peripheral surface the capstan, the inner edge of the conveyor belt including a plurality of projections, engageable with the peripheral surface of the capstan, the projections being disposed and shaped to increase friction therewith, and means for applying a longitudinal tension to the conveyor belt at least in the vicinity of a departure of the conveyor belt from the spiral shape, the improvement comprising, the projections having a cross-section in the form of a half of a teardrop, with a rounded rearward portion and a tapered forward portion, to facilitate disengagement of the projections from the peripheral surface.

According to a still further feature of the invention, there is provided a spiral conveyor of the type comprising; a conveyor belt of the type that is capable of telescoping at least one edge to conform to a spiral shape, a generally cylindrical capstan with a vertical central axis and a peripheral surface, the capstan including a plurality of parallel bars, the outer surfaces of the bars forming the peripheral surface, means for rotating the capstan about the vertical axis; at least a portion of the conveyor belt being conformed in the spiral shape with an inner edge thereof contacting the peripheral surface, the inner edge of the conveyor belt including a plurality of projections, engageable with the outer surface of the capstan, the projections being disposed and shaped to increase friction therewith, a longitudinally extending groove disposed in the outer surface of each of the bars, the groove being adapted to cooperate with one of the projections, and means for applying a longitudinal tension to the conveyor belt at least in the vicinity of a departure of the conveyor belt from the spiral shape, the improvement comprising, the bars disposed at an inclination with respect to the vertical axis, the inclination being generally parallel to a relative motion of the inner edge of the conveyor belt with respect to the peripheral surface of the capstan.

The above and other objects, features, and advantages of the invention will become apparent from the following description of the preferred embodiment read in conjunction with the accompanying drawings, in which like reference numerals designate the same elements.

BRIEF OF THE DESCRIPTION OF THE DRAWINGS

DETAILED DESCRIPTION OF THE PREFERRED EMBODIMENT

Figure 1:
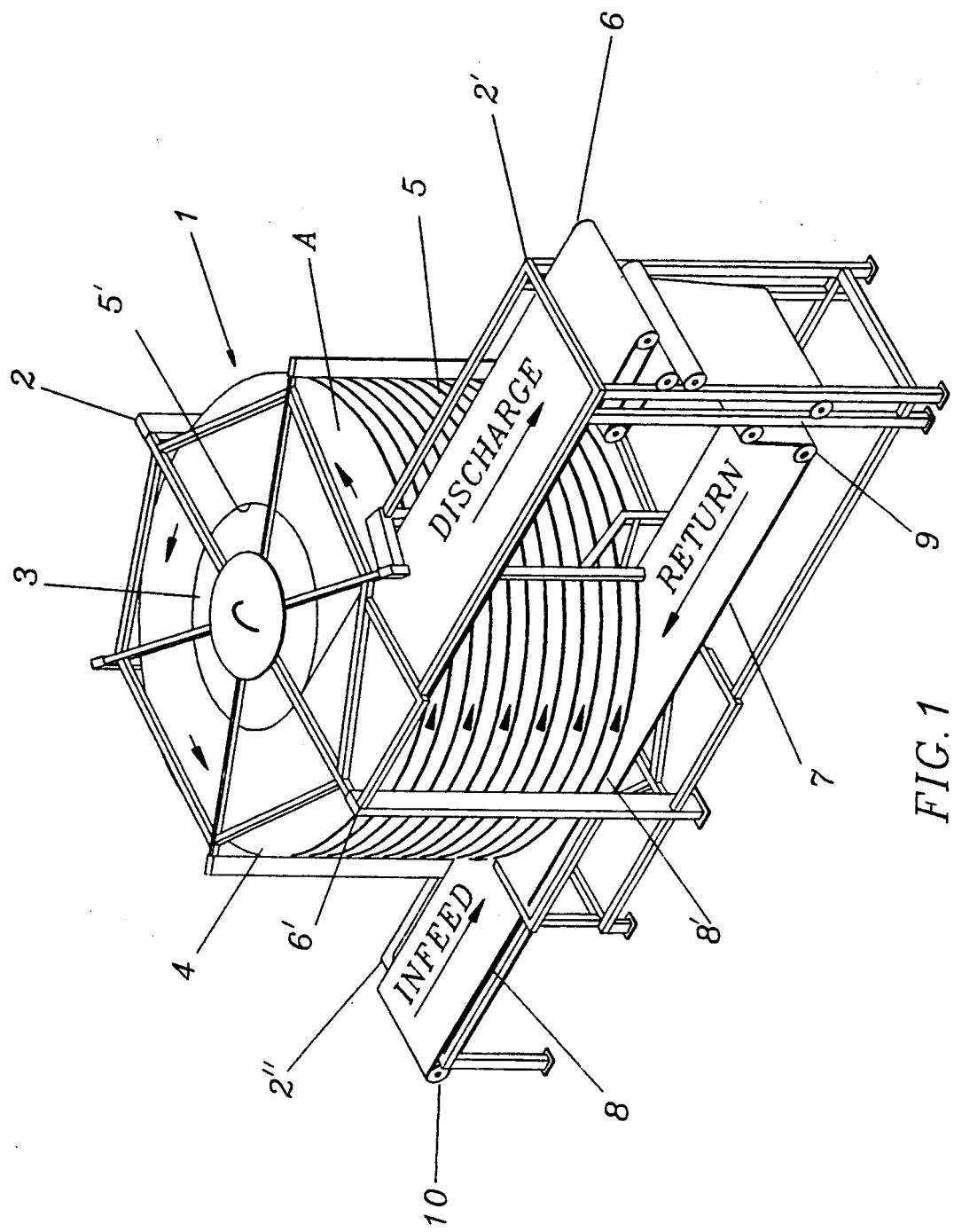
FIG. 1 is a perspective view of a reduced radius spiral conveyor.

Referring to FIG. 1, there is shown, generally at 1, a conventional reduced radius spiral conveyor system, wherein a frame 2 rotatably supports a capstan 3, around which is spirally supported a spiral portion 5 of a conveyor belt 4. Conveyor belt 4 also has a discharge portion 6, a return portion 7, and an infeed portion 8. As the capstan 3 is rotated by a conventional rotating means, not shown, for example a pulley driven by an electrically powered motor or the like, the periphery of capstan 3 transfers driving force to an inner edge 5' of spiral portion 5. The transfer of driving force causes conveyor belt 4 to move in the direction indicated by the arrows A. A plurality of pulleys 9, in the path of discharge portion 6 are rotatably supported by the discharge end 2' of frame 2, and serve to maintain tension on conveyor belt 4 as it disengages from capstan 3 and to direct it to the path of return portion 7. Return portion 7 ends at infeed pulley 10, which is rotatably supported at the infeed end 2" of frame 2 and reverses the direction of conveyor belt 4 to infeed portion 8.

Figure 2:
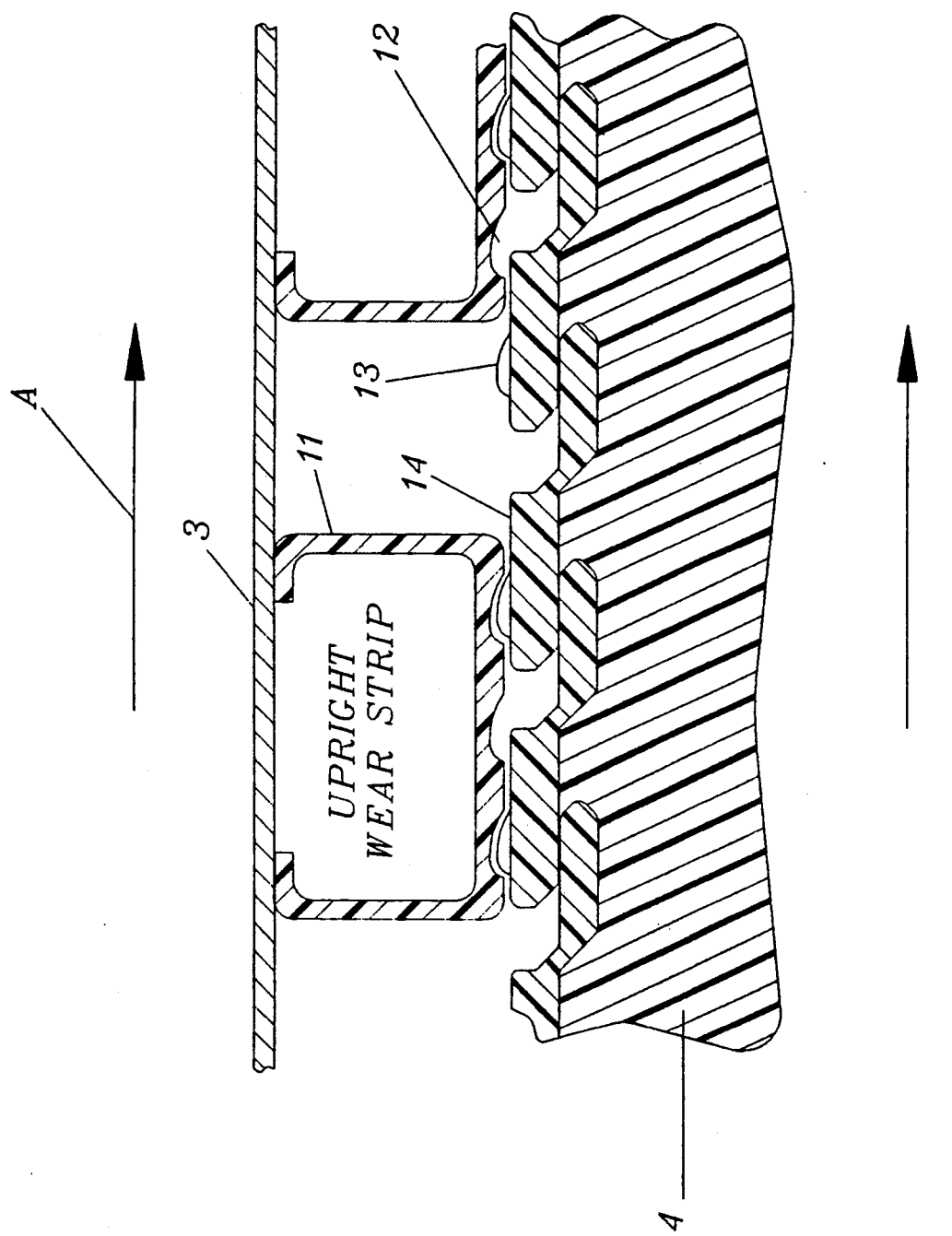
FIG. 2 illustrates the mating of half teardrop shaped projections of the conveyor belt with grooves of the capstan bars.
Figure 3:
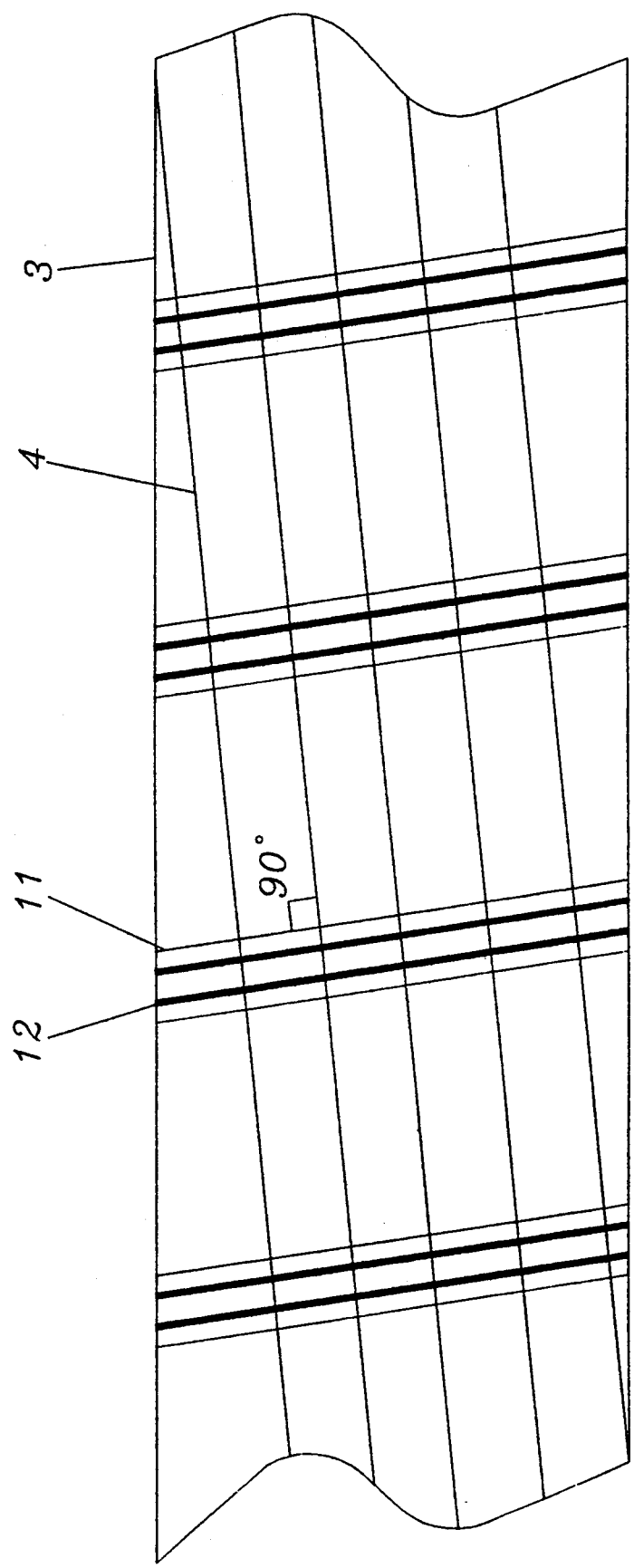
FIG. 3 is a schematic representation showing alignment angle of the bars of FIGS. 1 and 2 with relation to the conveyor belt.

Referring now to FIGS. 2 and 3, the outer periphery of capstan 3 is made up of a plurality of closely spaced parallel bars 11 that are positioned at regular intervals around capstan 3 and angled so that each bar 11 is perpendicular to the direction of travel of conveyor belt 4 (see FIG. 3).

A plurality of parallel grooves 12 (for example, three) are formed along the length of each bar 11. The cross sections of grooves 12 are half teardrop shaped, as shown in FIG. 2 with a rounded trailing edge and a tapered leading edge, to cooperate with corresponding half teardrop shaped projections 13 of inner edge links 14 of conveyor belt 4 to increase the friction between bars 11 and conveyor belt 4. Grooves 12 and projections 13 serve to increase the friction between bars 11 and inner edge links 14 so as to increase the transfer of forward drive force between the rotating capstan 3 and conveyor belt 4. A half teardrop shaped cross section is chosen for grooves 12 because, while it provides the necessary increased friction for transferring drive to conveyor belt 4, it allows the corresponding projections 13 to engage and disengage grooves 12 freely.

Referring now to FIGS. 1 and 2, capstan 3 drives conveyor belt 4 in the direction indicated by arrows A. As capstan 3 rotates and infeed portion 8 of conveyor belt 4 contacts capstan 3, projections 13 on inner edge links 14 are engaged by corresponding shaped grooves 12 on the outer side of bars 11. Because as belt 4 is driven by capstan 3 in the direction of its rotation, belt 4 moves upward from its infeed position 8' to its discharge position 6' projections 13 must slide upward along grooves 12 that engage them. If bars 11 of capstan 3 are positioned vertically, an acute angle formed between bars 11 and ascending conveyor belt 4 would create significant resistance to the upward movement of conveyor belt 4.

Referring to FIG. 3, to avoid the resistance to the upward movement of conveyor belt 4, each bar 11 is slanted backward with respect to the direction of rotation of capstan 3. The result is that each bar 11 and its grooves 12 are essentially perpendicular to the path of travel of conveyor belt 4. In this relationship (see FIG. 2) each projection 13 ascends along its corresponding groove 12 of bar 11 with maximum forward drive and minimal resistance to its upward movement until it is disengaged from that groove 12 at discharge point 6'. This relationship assures that the transfer of energy between capstan 3 and conveyor belt 4 remains constant.

Referring to FIGS. 1 and 2, tension is applied to conveyor belt 4 at discharge portion 6 by pulleys 9 to maintain contact and therefore a high degree of friction between inner edge links 14 and bars 11 to assure that a high degree of drive transfer efficiency between capstan 3 and conveyor belt 4 is maintained. However, in order to allow conveyor belt 4 to move upward along bars 11, some slack is required. This slack is created by rotating capstan 3 at a speed such that bars 11 travel from one to five percent faster than conveyor belt 4'.

Figure 4:
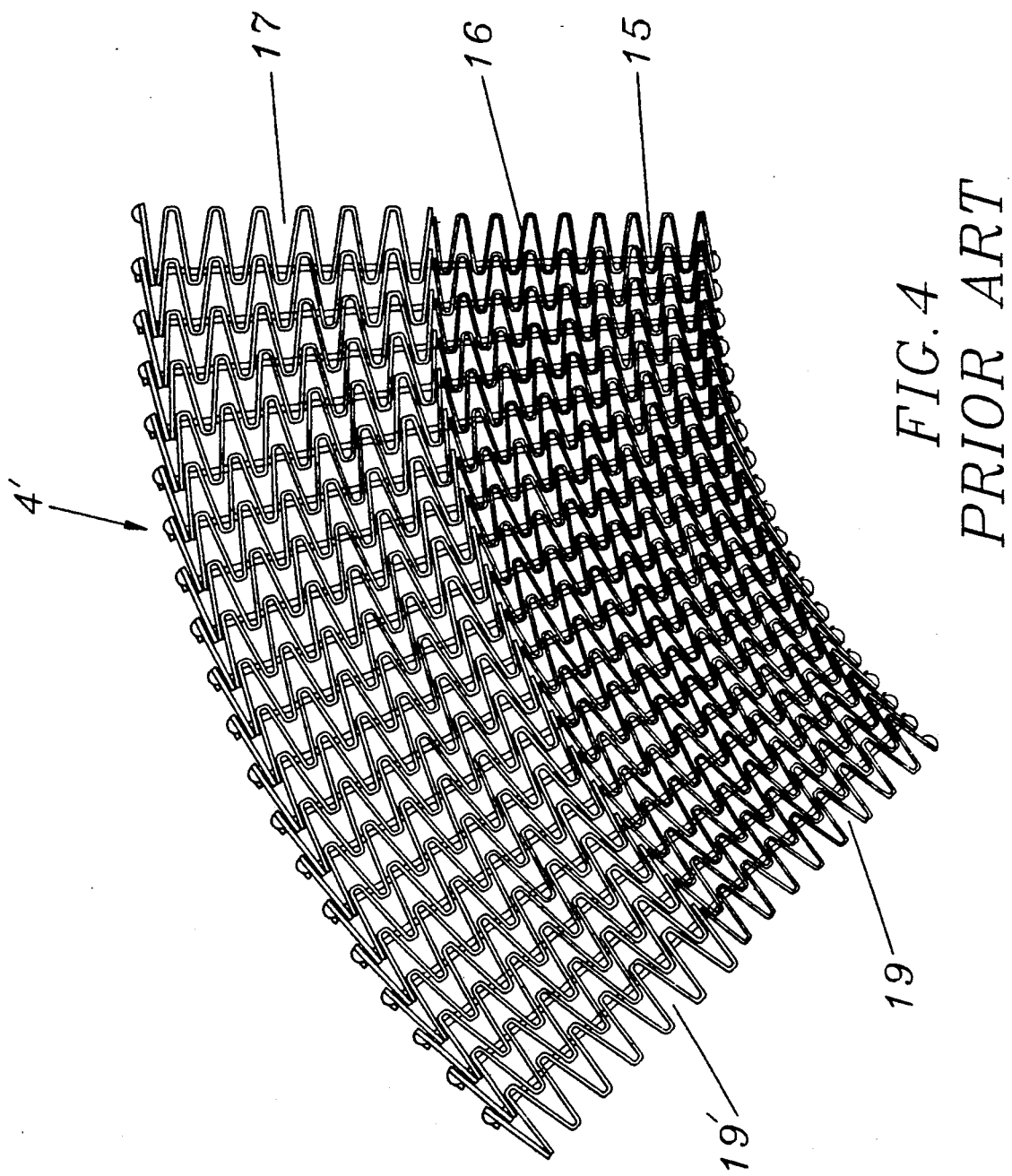
FIG. 4 is a plan view of a conventional flatware design conveyor belt.

Referring now to FIG. 4, a conventional conveyor belt 4' is made with two sections, an inner section 16 and an outer section 17, having different horizontally pitched plastic flatwire links 19 and 19' to facilitate its ability to turn around a reduced radius. Links 19 of the inner section 16 are smaller than links 19' of outer section 17. Common rods 15 join the links 19 and 19' into one dual pitch conveyor belt 4'. This design enhances the reduced radius turning ability of conveyor belt 4', as smaller links 19 of inner section 16 collapse increasingly toward its inner edge, while larger links 19' of outer section 17 expand toward the outer edge of conveyor belt 4' to form the reduced radius turn. The dual pitch design enhances the reduced radius turning capability of conveyor belt 4' because the use of larger links 19' at outer section 17 than links 19 of inner section 16 permits a higher ratio of expansion of outer links 19' and collapse of inner links 19. At the center of conveyor belt 4', inner section 16 and outer section 17 simply bear against each other. This type of conveyor belt 4' is usable only with a low to medium tension system.

Figure 4A:
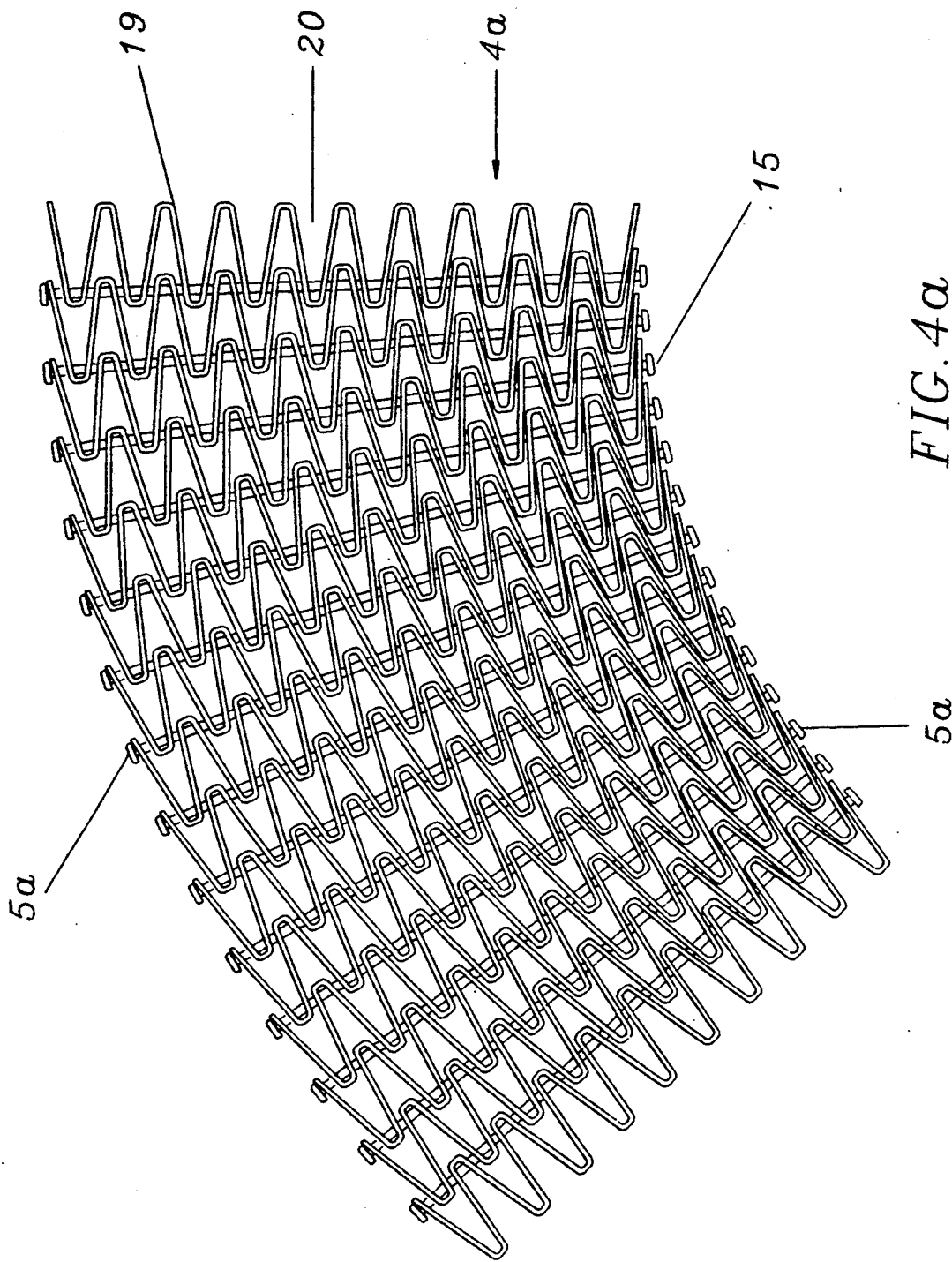
FIG. 4A is a plan view of a single pitch plastic flatware design conveyor belt, arranged in accord with the present invention.
Figure 4B:
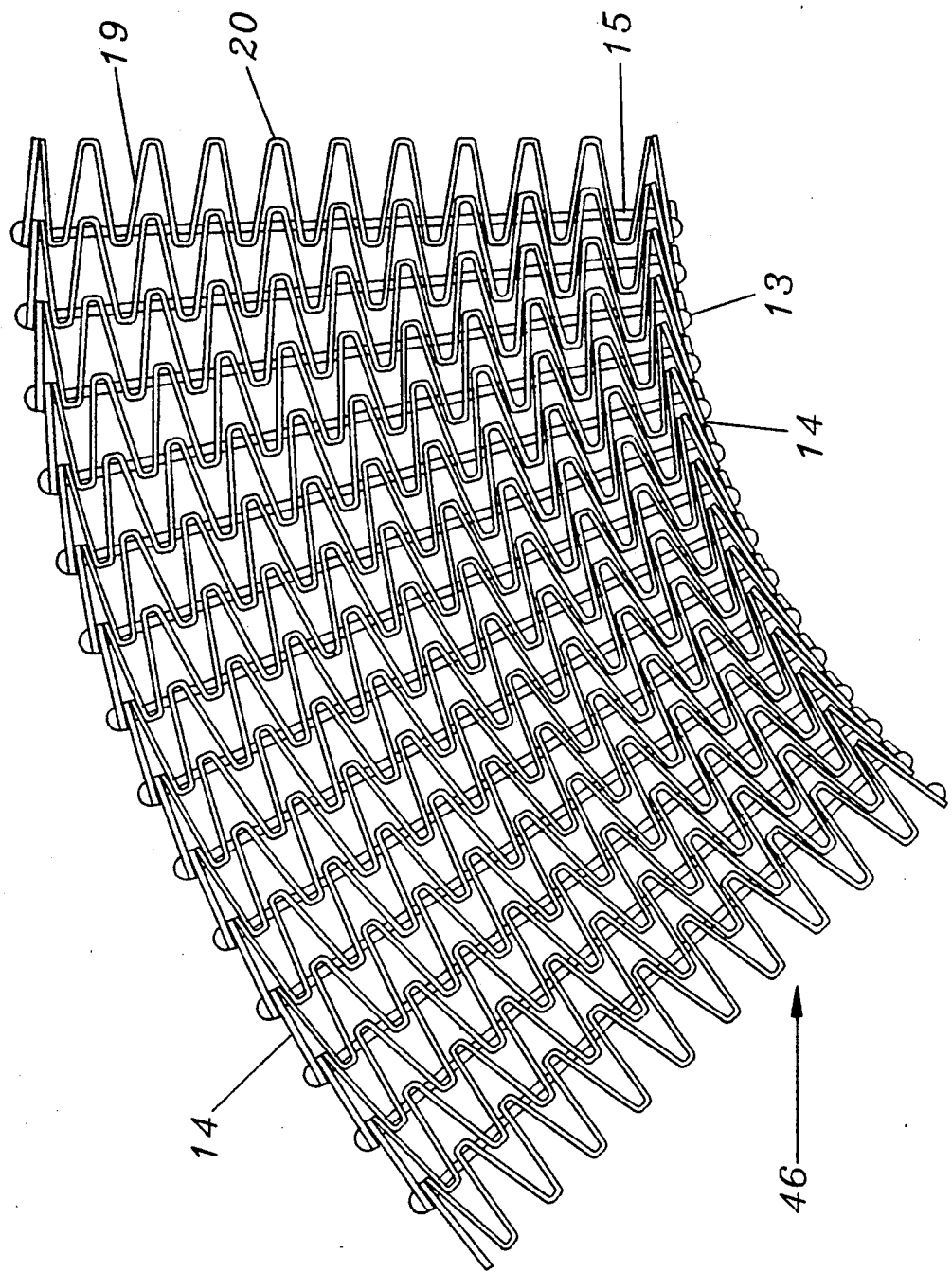
FIG. 4B is a plan view of a single pitch plastic flatware design conveyor belt with edge reenforcing links and projections arranged in accord with the present invention.

Referring to FIGS. 4A and 4B, there are shown two embodiments of plastic flatwire link conveyor belts 4a and 4b that may be used with the present invention. These are single pitch conveyor belts that use single sections 20 of links 19 across their entire widths. Single rods 15 spaced between link pairs, join links 20 to each other. Conveyor belts 4a and 4b have the advantage of being able to telescope down equally on either edge 5a with the opposite edge 5a remaining fully expanded. The ability to telescope equally on either edge 5a allows belts 4a and 4b to be curved multidirectionally. Because these conveyor belts 4 can be curved in either direction, they can be turned over periodically to assure even wear and extended life during their use in conveyor system 1.

Note that single pitch conveyor belts 4a can be supplied with inner edge links 14 to reenforce its edges 14a (as shown in conveyor belt 4b of FIG. 4B), and may have projections 13 for increased drive friction. However, because conveyor belts 4b are curvable in either direction, inner edge links 14 and projections 13 can be provided on both edges 5a.

Figure 5:
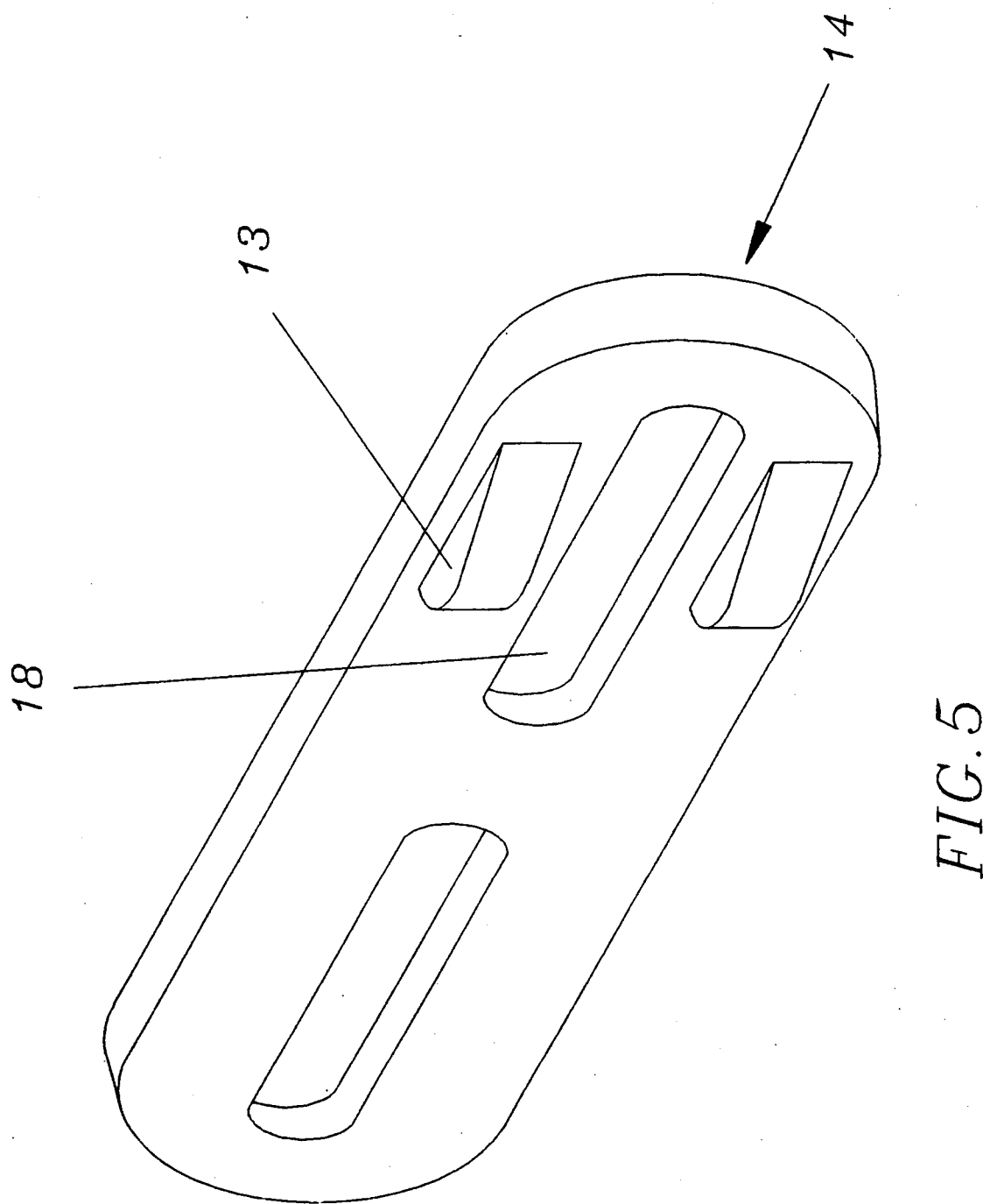
FIG. 5 is a perspective view of a textured inner edge link for the conveyor belt of FIG. 4, arranged in accord with the present invention.

Referring now to FIG. 5, inner edge link 14 may be used with the conventional two section conveyor belt 4', described above with reference to FIG. 4, as well as with conveyor belt 4b of FIG. 4B, both to strengthen it and increase the drive friction between it and a conveyor capstan 3. Inner edge link 14 includes two slots 18 that allow the expansion and contraction of the inner edge of conveyor belt 4 as it moves between spiral and straight paths during operation. Teardrop profiled projections 13 increase the friction between conveyor belt 4 and conveyor capstan 3.

Figure 6:
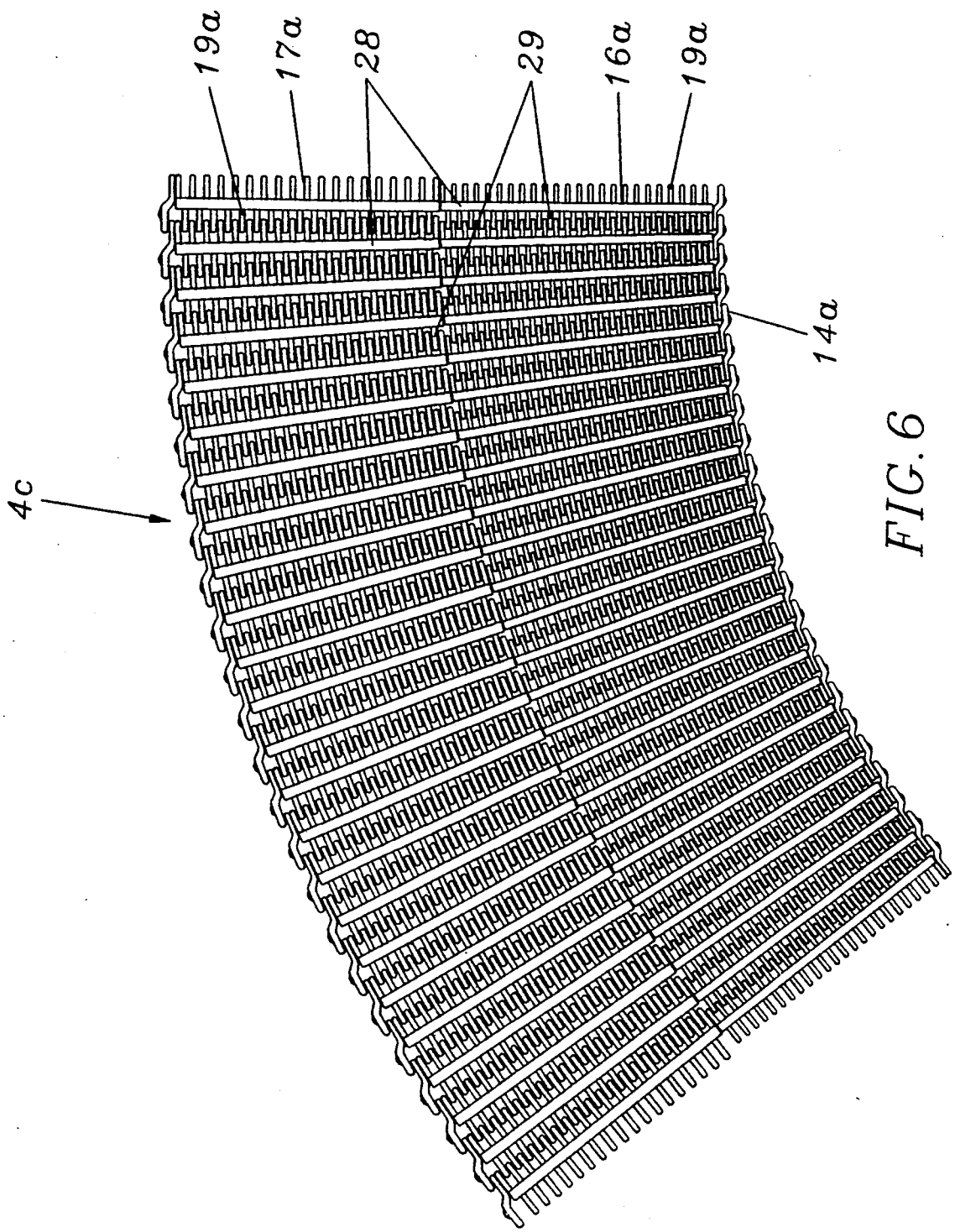
FIG. 6 is a plan view of a conventional plastic conveyor belt assembled from separately molded components.
Figure 7:
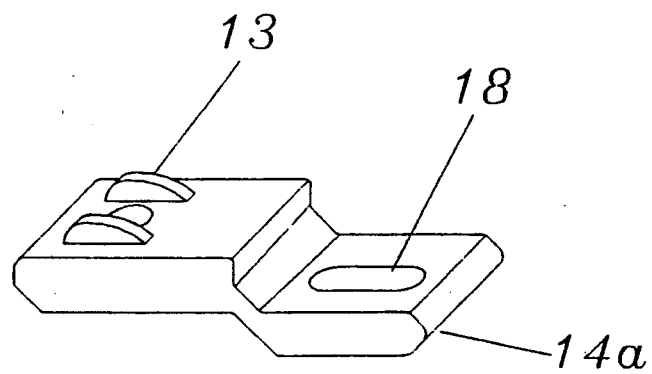
FIG. 7 is a perspective view of a textured inner edge link for the a conveyor belt of FIG. 6, arranged in accord with the present invention.

Referring to FIG. 6 conveyor belt, is basically of the same dual pitch type as conveyor belt 4' shown in FIG. 4. The difference is that conveyor belt 4c is constructed of plastic links 19a and 19a' solid transverse ribs 28 that support longitudinal fingers 29. Conveyor belt 4' of FIG. 4 is constructed of flatwire type link sections. Inner edge links 14a that may be used with this belt are shown in FIG. 7, and perform the same function as inner edge link 14 shown in FIG. 5.

As shown in FIG. 6 inner section 16a of conveyor belt 4c is made of links 19a that have a smaller pitch than that of outer links 19a' that of outer section 17a. Single rods 15a are used to join both links 19a and 19a' to form conveyor belt 4c.

The major advantage offered by conveyor belt 4c is the increased strength and tension bearing capability that results from solid transverse rib 28 and longitudinal fingers 29 of links 19a and outer links 19a'.

Figure 8:
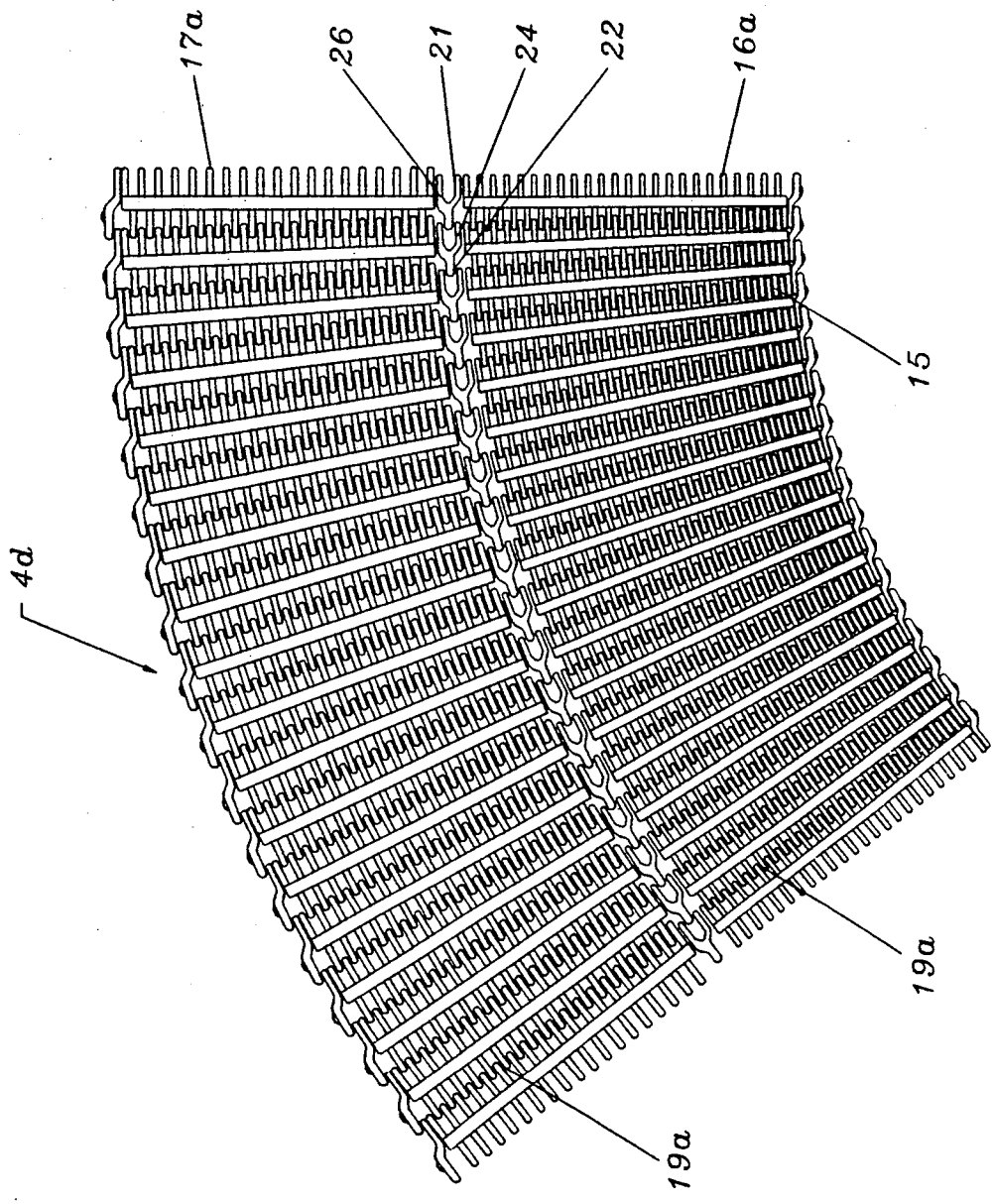
FIG. 8 is a plastic conveyor belt, having a center tension-bearing link, in accord with the present invention.

Referring to FIG. 8, conveyor belt 4d has two sections similar to those shown in FIG. 6, but with the following major difference: links 19a of inner section 16a and outer links 19a' of outer section 17a are separated by a row of tension links 21, rather than abut each other. The purpose of tension links 21 is to transfer drive from inner section 16a to outer section 17a and distribute the load to outer section 17a, greatly increasing the load bearing capacity of a conveyor belt 4d to which it is added.

Figure 9:
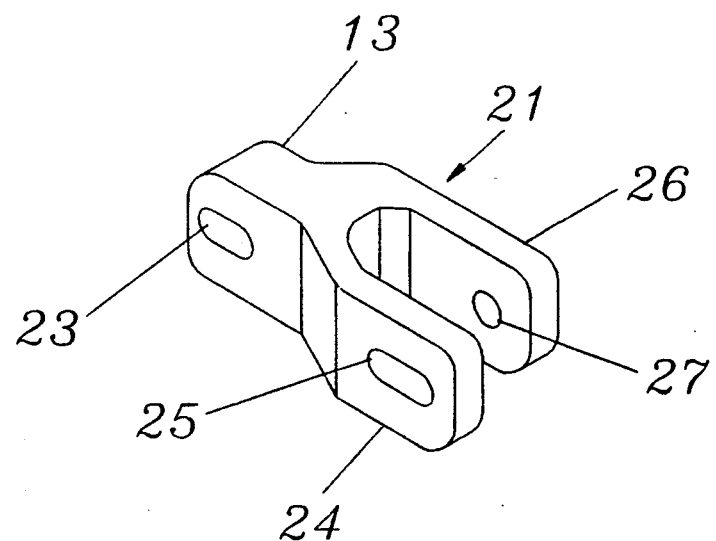
FIG. 9 is a perspective view of a tension bearing center link, in accord with the present invention.

Tension links 21 are shown in detail in FIG. 9. Each tension link 21 is in the form of a clevis, or modified "Y". A central leg 22 of each tension link 21 has an elongated slot 23. A similar slot 25 is formed in an inner leg 24, while an outer leg 26 has a circular hole 27. Tension link 21 is preferably made of a high strength industrial plastic to accommodate high belt tensions.

Referring to FIG. 8, the short inside leg 24 of tension link 21 accepts the drive loads with their resultant tension from inner section 16a of conveyor belt 4d, while the long outer leg 26 bears the drag of the loose outer section 17a. Between inner leg 24 and outer leg 26, there is sufficient space to accommodate central leg 22 of the following tension link 21 with adequate clearance to allow tension links 21 to turn in the required radius of the conveyor system. Inner edge links 14a used with this conveyor belt 4 can be of the type shown in FIG. 7 to increase the drive coupling efficiency of the conveyor system.

Having described preferred embodiments of the invention with reference to the accompanying drawings, it is to be understood that the invention is not limited to those precise embodiments, and that various changes and modifications may be affected therein by one skilled in the art without departing from the scope or spirit of the invention as defined in the appended claims.

What is claimed is:

1. In a conveyor belt of the type having a normal orientation to follow one path and alternate orientations with a collapsed inner edge and an expanded outer edge to follow alternate paths curved laterally to one side of said path, said belt including:

a plurality of rods, spaced along said conveyor belt, extending laterally across the belt and having inner and outer ends along said inner and said outer edges of said conveyor belt and central portions therebetween;

central link means including central links arranged in at least one longitudinal row pivotally interconnecting the central portions of said rods, said central link means having tension with said rods in said normal orientation and in at least some of said alternate orientations;

edge link means arranged in at least one longitudinal row along each edge of the belt including inner links and outer links pivotally interconnecting said inner and outer ends of said rods, said edge link means being longitudinally collapsible and expandable along their respective row;

said inner links having a normal fully expanded and tractive condition in said normal orientation and a collapsed condition in said alternate orientations; and said outer links having a normal condition in said normal orientation and being expanded from said normal condition in said alternate orientations; the improvement comprising:

said central links being substantially in the form of an asymmetrical, truncated clevis including a center portion and two opposing legs of unequal length, said central links being disposed with the shorter of said two legs on the inner side of the belt so as to accept drive loads and the resultant tension from said inner links, and the longer of said two legs on the outer side of the belt so as to accept drag from said outer links, when the belt is in said normal orientation;

said legs being spaced apart sufficiently to loosely allow insertion of the center portion of another of said center links therebetween.

2. The conveyor belt of claim 1, where said belt is predominantly formed of plastic.

* * * * *